Aug. 9, 1927.  W. LEWIS  1,638,665
MOLDING MACHINE
Filed Sept. 26, 1925    10 Sheets-Sheet 4

WITNESS:
Robt. R. Kitchel.

INVENTOR
Wilfred Lewis
BY
Augustus B S Houghton
ATTORNEY.

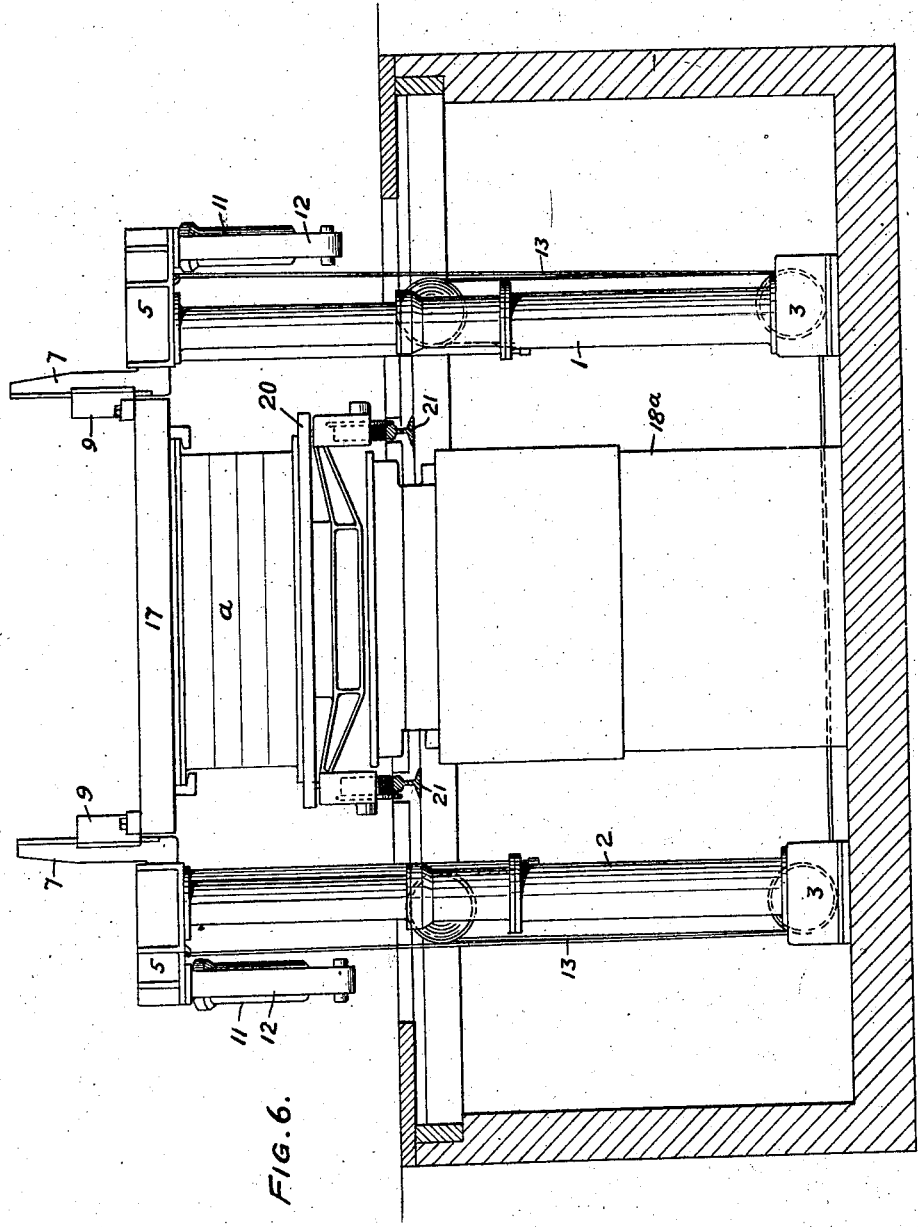

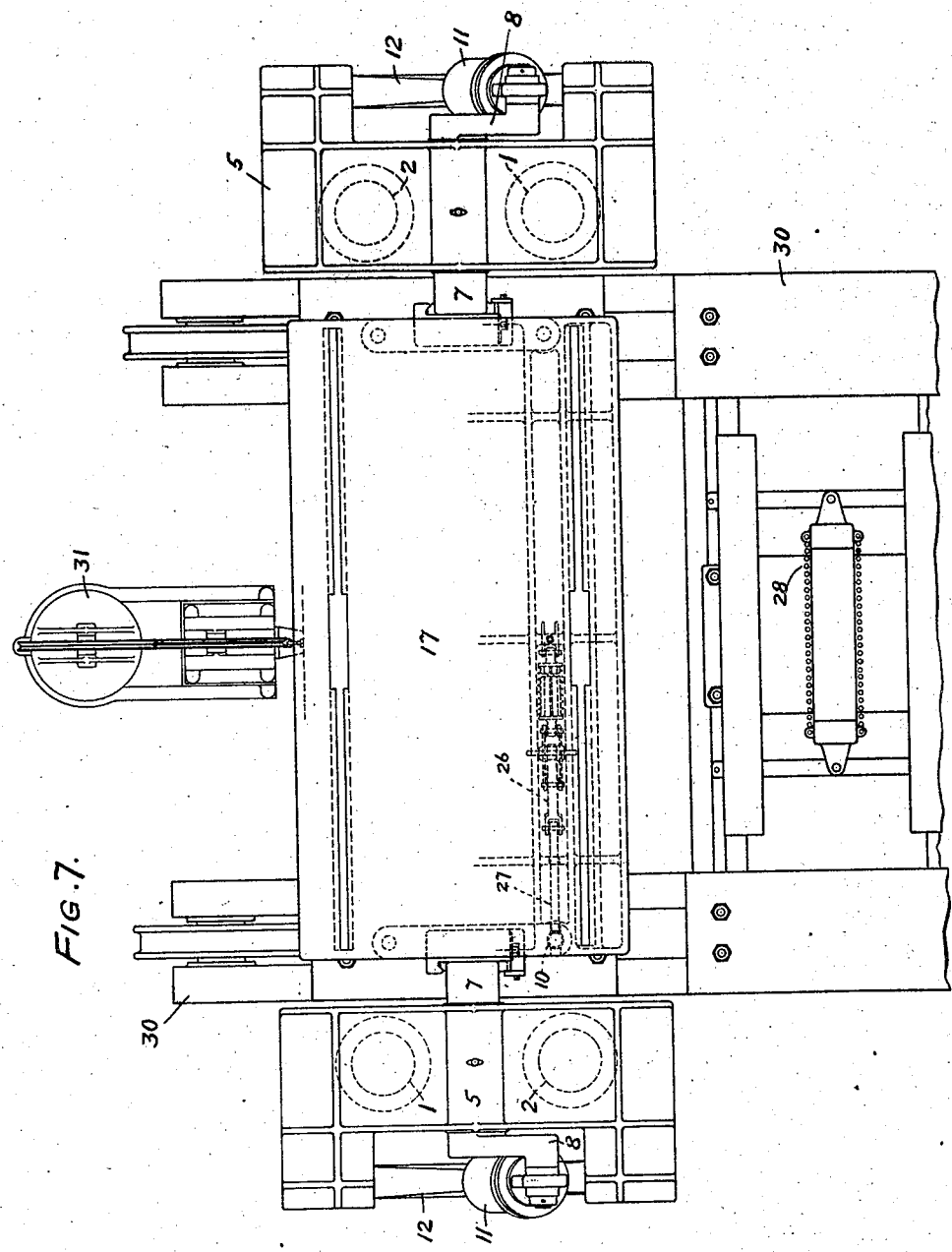

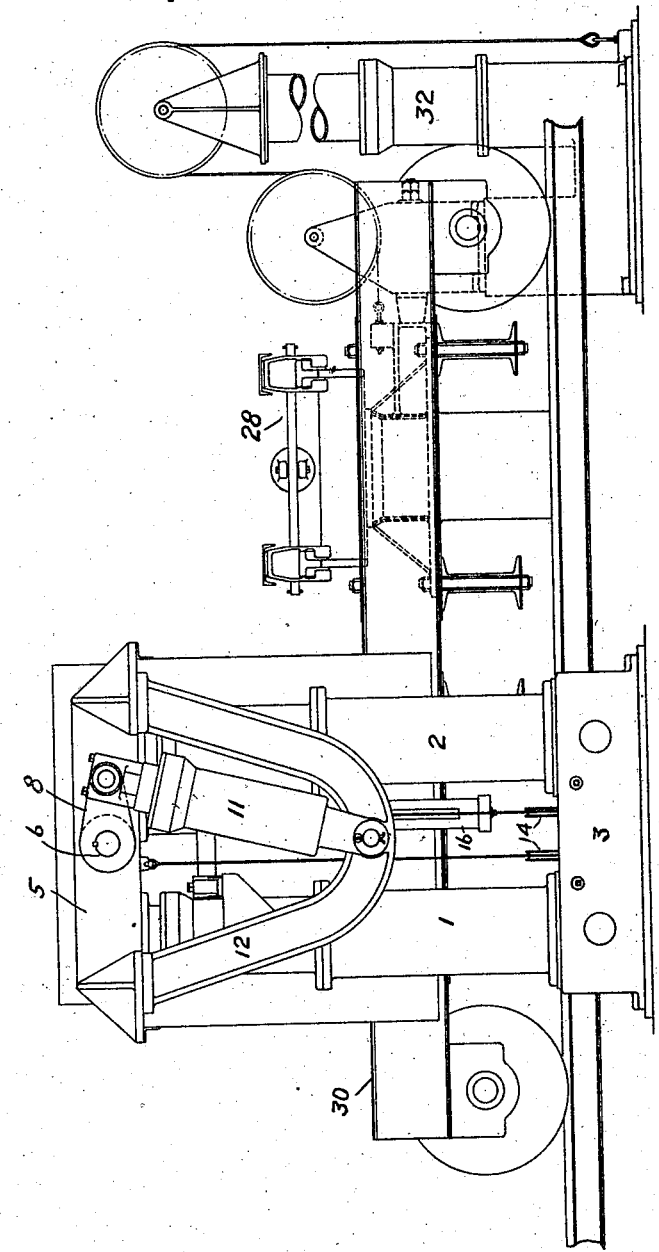

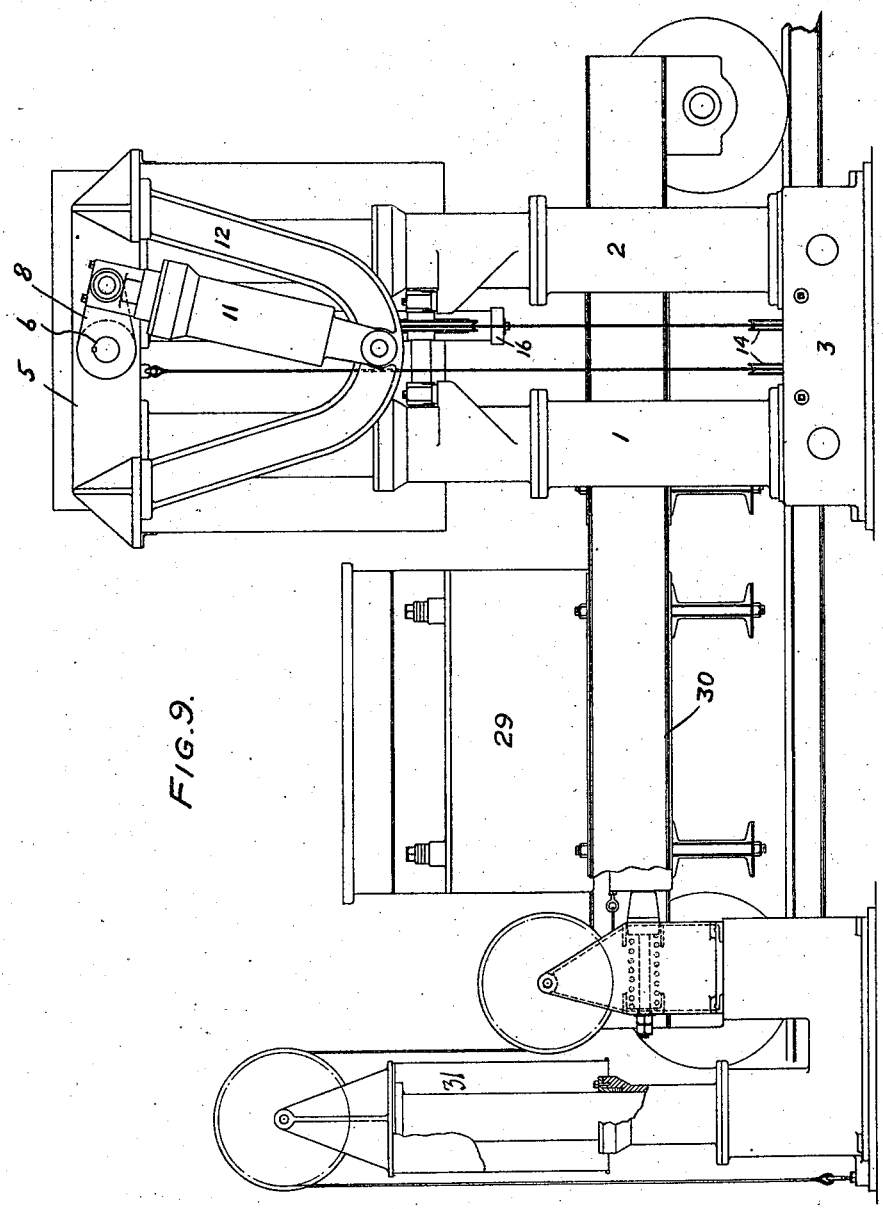

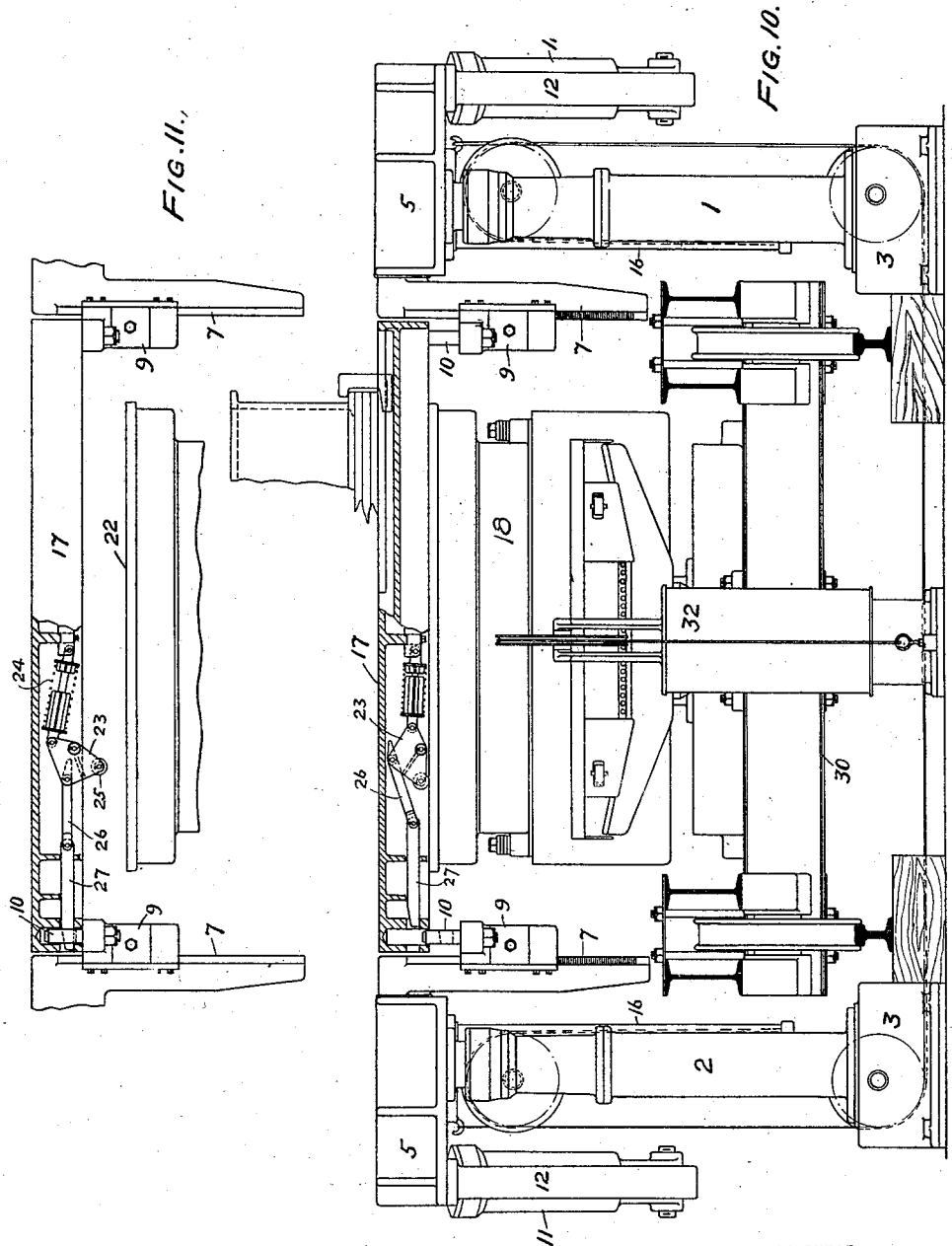

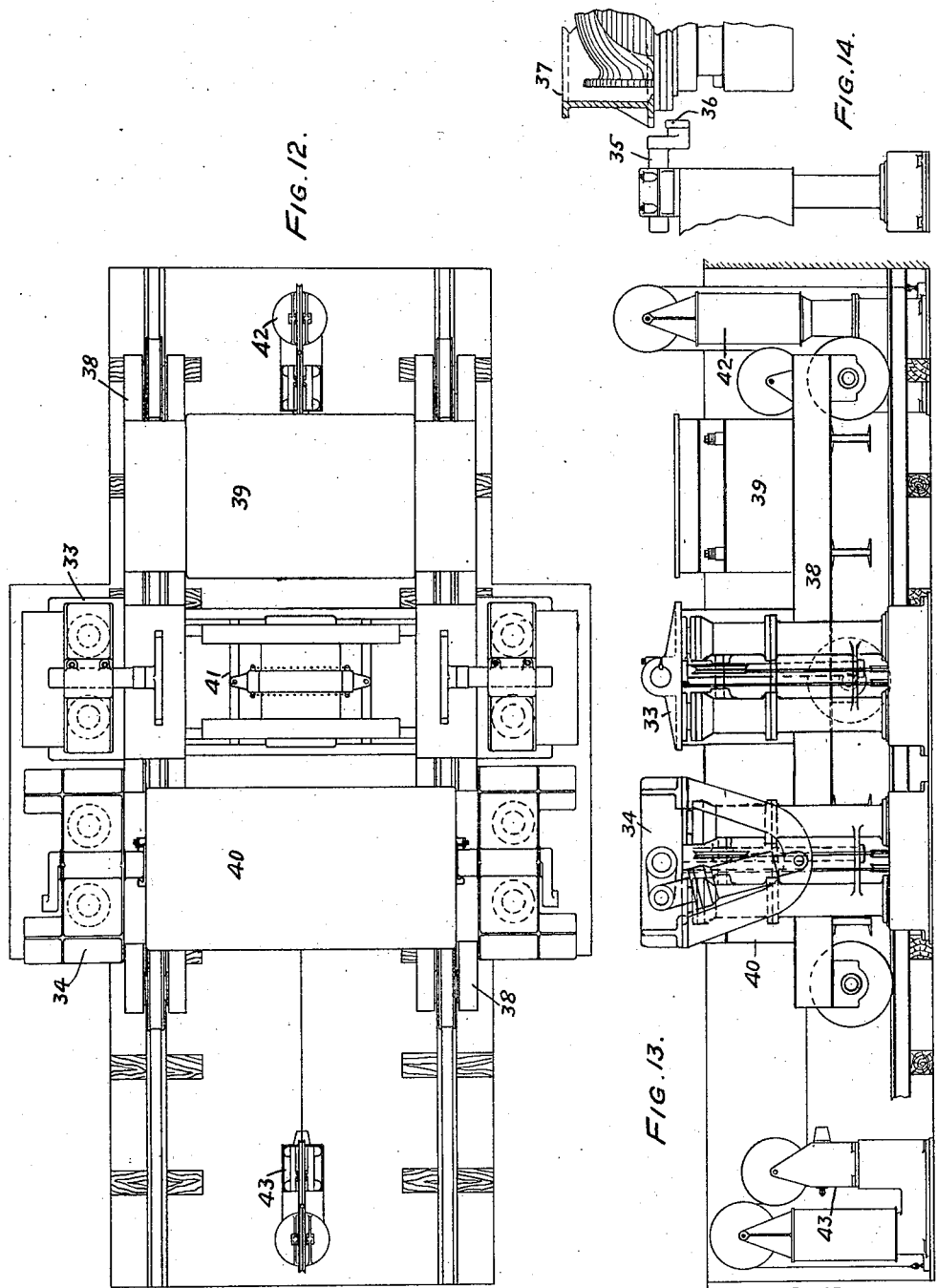

Patented Aug. 9, 1927.

1,638,665

UNITED STATES PATENT OFFICE.

WILFRED LEWIS, OF HAVERFORD, PENNSYLVANIA, ASSIGNOR TO THE TABOR MANUFACTURING COMPANY, OF PHILADELPHIA, PENNSYLVANIA, A CORPORATION OF PENNSYLVANIA.

MOLDING MACHINE.

Application filed September 26, 1925. Serial No. 58,687.

Objects of the present invention are to improve and simplify the construction in such a way that the parts are better accommodated and in such a way that the operation is improved; to improve the construction, location and operation of the automatic locking mechanism by which the mold table is connected and disconnected with its carrier arms; to reduce the clearance required for rolling over the flask and depositing it on the flask receiving table or means so that the stroke of the draw plungers is comparatively short, reducing the first cost and saving power and time; to provide for making and assembling a drag mold and a cope on one and the same machine; to provide for the production of complete molds in large quantities ready to pour such as tunnel plate segments, bath tubs and the like; to provide an efficient, comparatively simple and durable jar ramming molding machine or shockless jar ramming molding machine having independent draw cylinders; and to provide rollover cylinders and abutments carried by one and the same element or head.

Other objects of the invention will appear from the following description which will be given in connection with the accompanying drawings forming part hereof and which illustrate not only features of construction but also their association and adaptation in different forms.

The invention will be first described and then pointed out in the appended claims.

In the drawings

Fig. 6 is a view very much like Fig. 1 but showing the machine arranged in a pit and provided with plain jarring mechanism and also showing the mold table in inverted position with a car in place.

Fig. 7 is a top or plan view of a modification in which the shockless jarring mechanism and the flask receiving mechanism are mounted on a car showing also one of the hydraulic pistons and cylinders employed for traversing the car.

Fig. 8 is a side elevation of Fig. 7 showing the other car operating piston and cylinder.

Fig. 9 is a view similar to Fig. 7 showing another position of the car which is flask receiving position.

Fig. 10 is an elevational view, partly in section, of Fig. 7.

Fig. 11 is a fragmentary view showing a different position of some of the parts illustrated in Fig. 10.

Fig. 12 is a plan view of another modification constituting a cope and drag machine.

Fig. 13 is a side view of Fig. 12 showing the pit in section, and

Fig. 14 is a detail view of the cope lifting device where the pattern is not rolled over.

Figure 1:
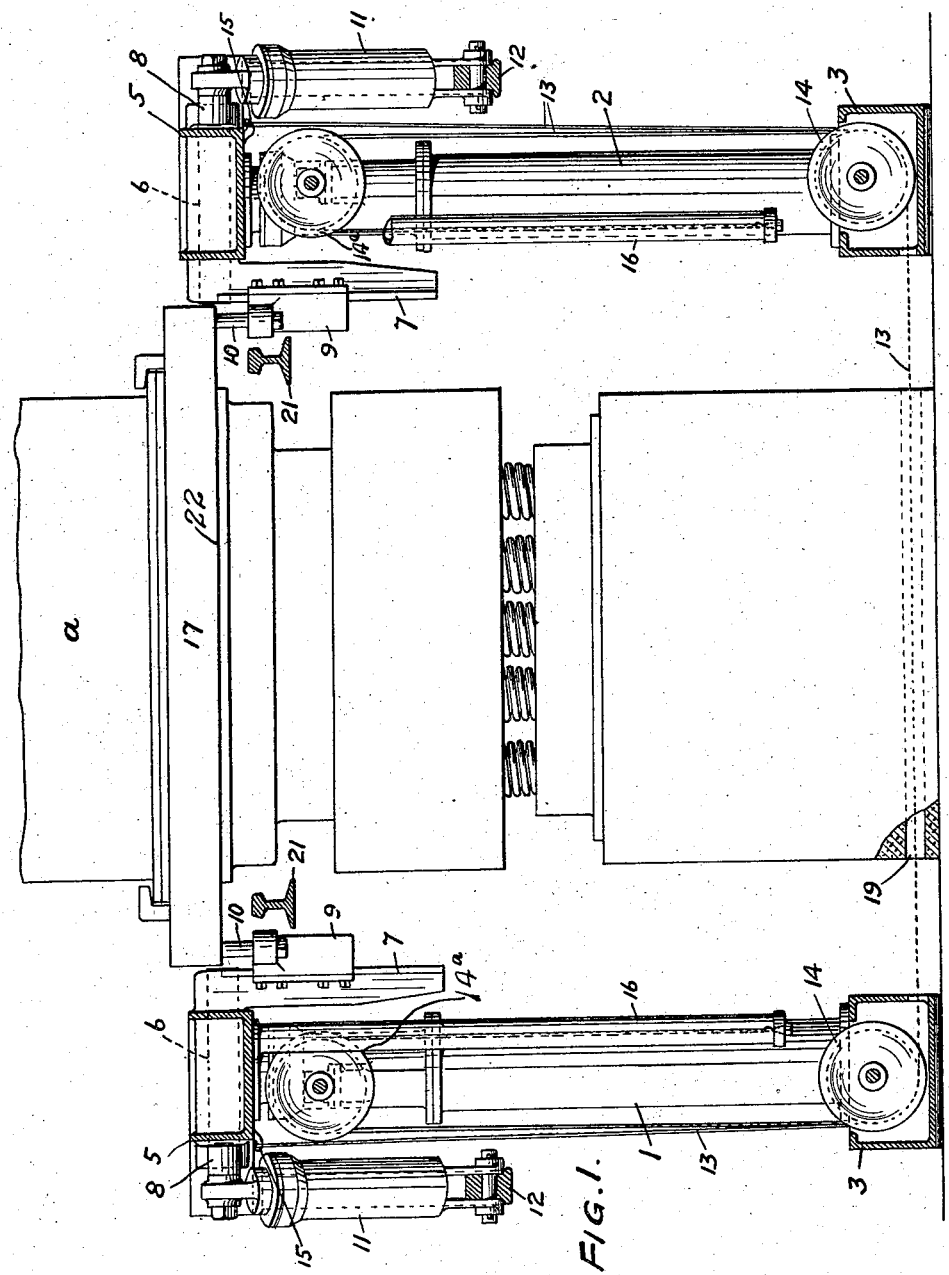
Figure 1 is a front view with parts in section of a shockless and jar ramming molding machine embodying features of the invention.
Figure 2:
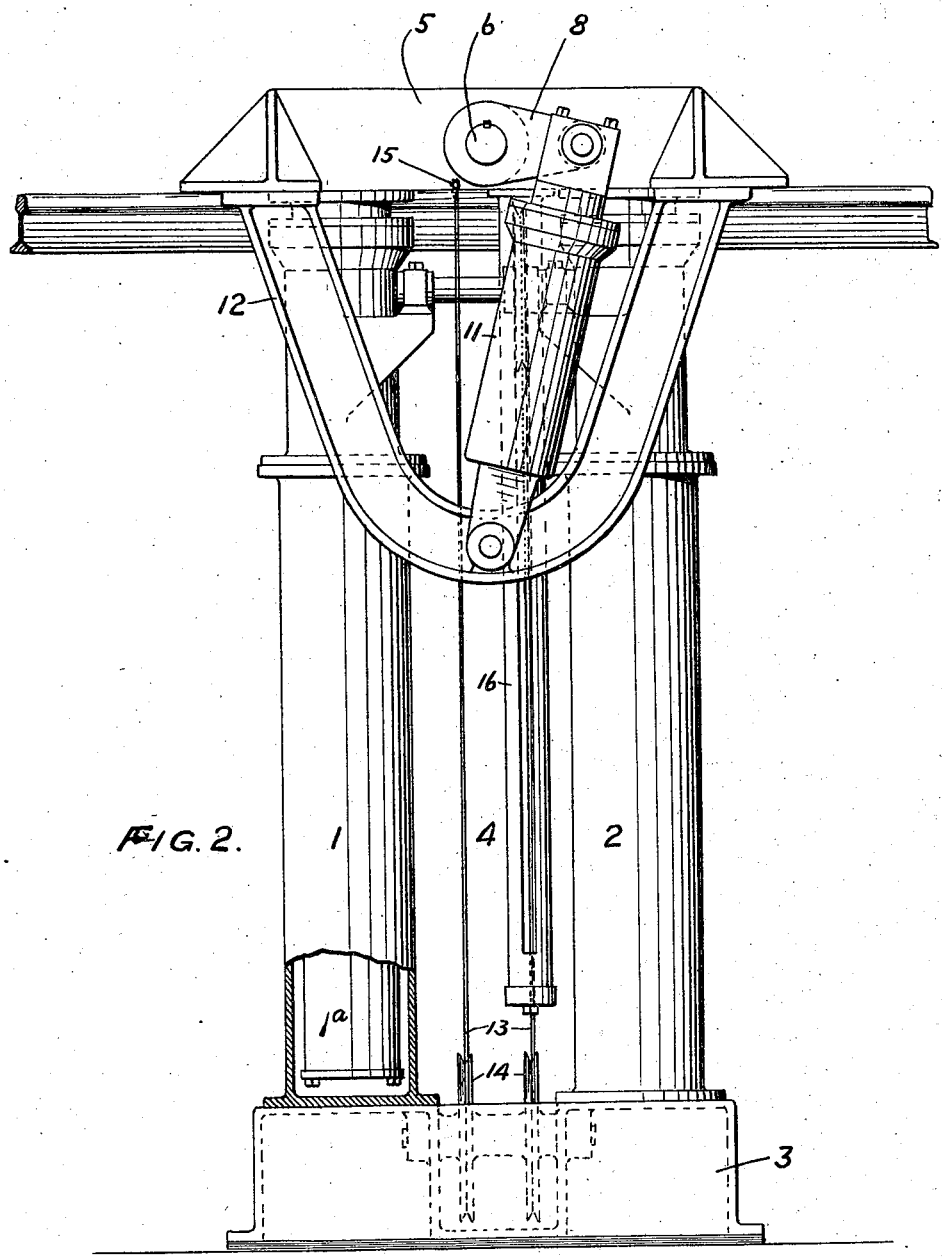
Fig. 2 is an end view partly in section of the same.
Figure 3:
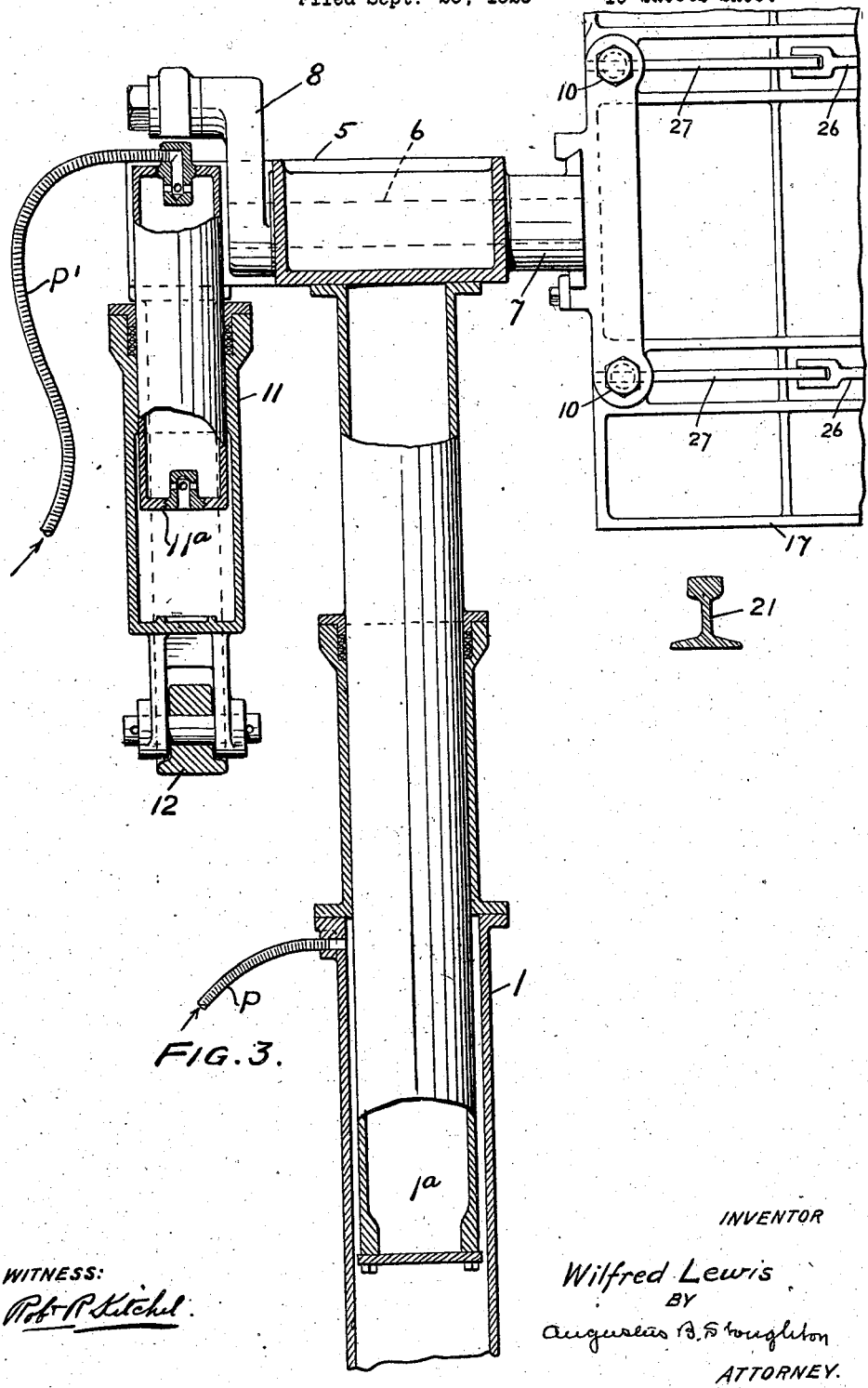
Fig. 3 is a view partly in section and drawn to an enlarged scale and illustrating parts that are shown to the left in Fig. 1 with the mold table partly rolled over.

Referring more particularly to Figs. 1 to 5, 1 and 2 are a pair of spaced casings 4 lifting plungers 1ª and they are arranged at each side of the machine. They are shown as mounted upon suitable bases 3 so that there are four lifting plungers arranged generally at the corners of an imaginary rectangle, and as has been said, there is space, generally indicated at 4, provided between each pair 1 and 2 of casings 4 lifting plungers for a purpose to be presently described. There is a lifting head 5 for each pair of plungers. 6 is a double armed crank shaft mounted in each head 5 whereof one arm 7, Fig. 1, is a mold table carrier arm and whereof the other arm 8, Fig. 2, is a rollover arm. As shown the arm 7 is provided with an adjustable mold table carrying bracket 9 having a pair of slotted pins 10, Figs. 3, 4 and 5. 11 is a rollover cylinder and piston interposed between the rollover arm 8 and its lifting head or, more accurately, a U-shaped bracket 12 depending therefrom. Referring to Fig. 3 the rollover cylinder 11, pivoted on the yoke 12, carries the hollow plunger 11ª which acts as a reservoir or tank from which a liquid, preferably oil, may be expelled by air pressure introduced through the pipe P¹ by a valve, not shown, under the control of the operator. The method employed is usual and serves to conserve oil as an operating liquid, while the compressed air is discharged as it must be when the oil is driven back into its reservoir. Similarly the draw plunger 1ª is raised by compressed air admitted through pipe P or by oil from a tank under pressure in which it is controlled by the operator through the medium of compressed air. The space 4 and space provided in the bases 3 accommodate parallel motion cable gear including a cable 13, sheaves 14, journaled in the bases 3, terminal connection 15 at the head 5, and a longitudinally slotted tube 16 depending from the head 5 and constituting the other terminal connection. The slot in the tube permits the cable to bend around the top sheave 14ª when the lifting head rises. It may be remarked that the construction at each side of the machine as shown in Fig. 1 is duplicate and for that reason has been above described in the singular rather than in the plural. 17 is a mold table having detachable lift off pin connection with the table carrying arms 7 by means of the slotted pins 10 although it might be more accurate to say that the connection of the table 17 with the arms 7 is by way of the adjustable brackets 9. It may be remarked that the pattern is not shown because it and its accessories are too well understood to require illustration.

Figure 4:
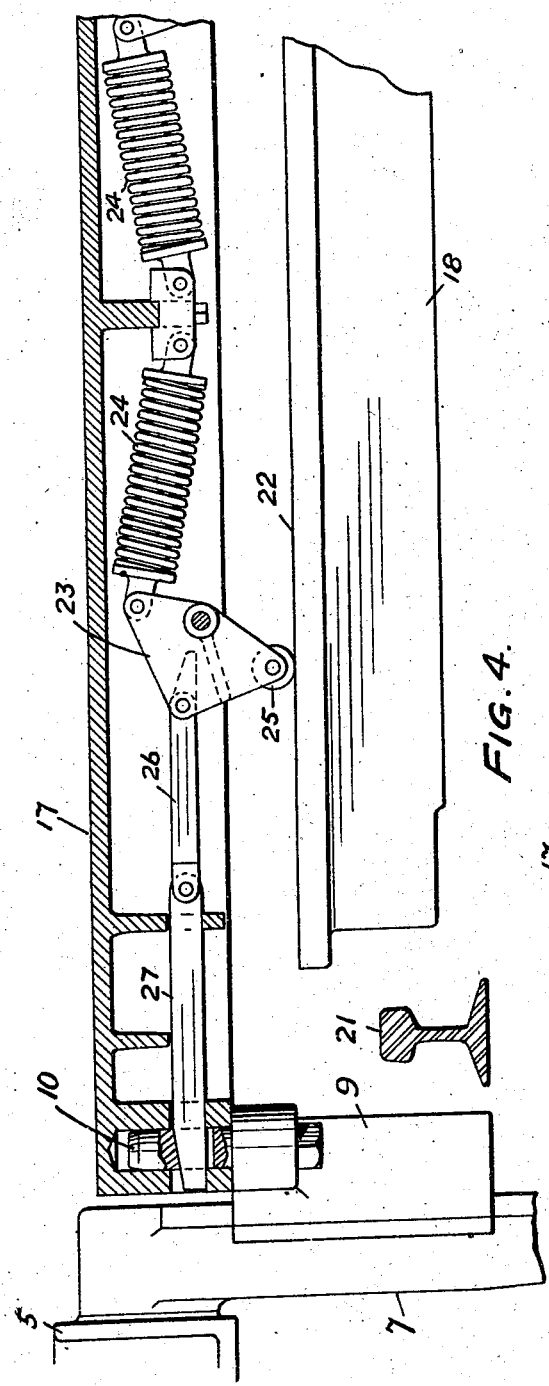
Figs. 4 and 5 are elevational views drawn to an enlarged scale and partly in section and illustrating two positions of one part of the locking mechanism which is duplicated and which is operated by the top face of the jar ramming machine mechanism for attaching and detaching the rollover table.
Figure 5:
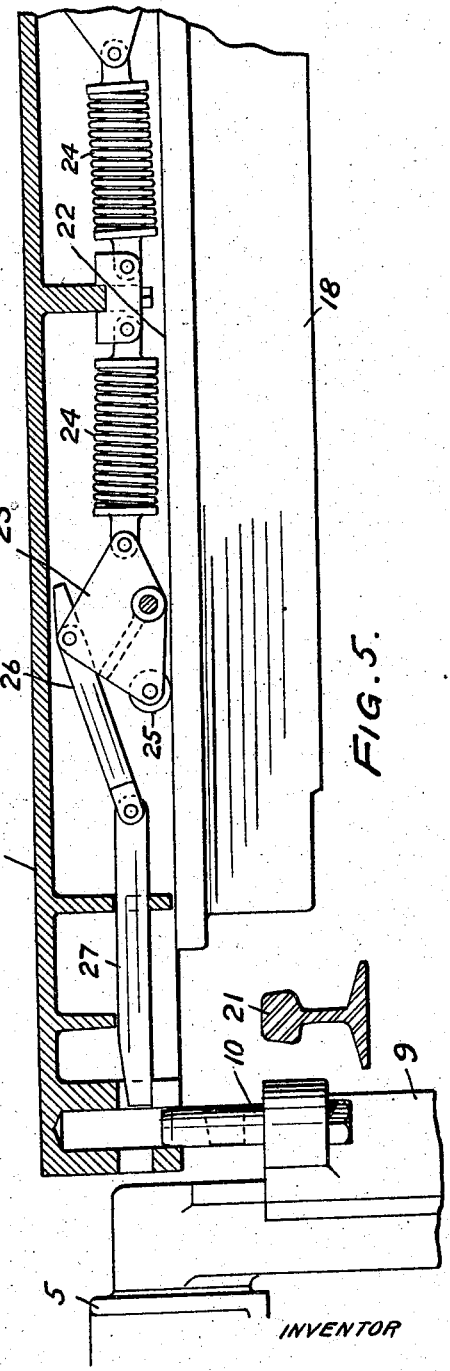

Referring more particularly to Figs. 1–5, 18 is shockless jar ramming mechanism, and referring to Fig. 6, 18ª is plain jar ramming mechanism. In each case the jar ramming mechanism is fixed and by reason of the described location of the parallel motion cable gear the latter can be accommodated by an opening 19 provided through the base of the jar ramming mechanism which gets the cable out of the way of the operator. 20, Fig. 6, is flask receiving mechanism shown in the form of a car adapted to travel on rails 21 and to be run into and out of the machine. Referring more particularly to Figs. 4 and 5 there is a spring locking mechanism carried by the mold table 17 and adapted to normally lock the mold table to the brackets 9 of the carrying arms 7 and adapted to be released by contact with the face 22 of the jar ramming machine. As shown this mechanism consists of a repetition of sets of duplicate parts of which one set will be described. 23 is a bell crank lever pivoted to the mold table and pressed by a spring 24 into the position shown in Fig. 4 in which it presents the projection or roller 25 in projected position, and operating through the link 26 projects the bolt 27 through the slot provided in the pin 10, and thus the four bolts 27 operate to immovably connect the mold table and the table carrying arms 7. Relative movement of the upper face 22 of the jar ramming mechanism and the projection 25, as shown in Fig. 5, results in the turning of the bell crank lever 23, compressing the spring 24, and withdrawing the bolts 27, thus releasing the mold table from the arms 7 and depositing it upon the jar ramming mechanism.

The mode of operation may be described as follows:

The mold flask a with its pattern in place is placed on the mold table 17, and proper securing or clamping means are applied and sand is supplied. By the operation of the jar ramming machine mechanism 18 its top surface 22, acting upon the locking mechanism as shown in Fig. 5, uncouples the mold table from the table carrying arms 7. The normal operation of the jar ramming machine rams the sand while the arms 7 and parts connected therewith remain at rest in the position shown in Fig. 1. Upon completion of the ramming operation the lifting plungers of the casings 1 and 2 under the control of the parallel motion cable gear lift the mold table 17 above the top face 22 of the jar ramming machine so that the locking mechanism assuming the position shown in Fig. 4 immovably connects the mold and mold table with the arms 7 and rollover mechanism. The car 20 is run into the machine, Fig. 6, and the mold rolled over by the rollover cylinders 11 and in such inverted position lowered onto the car. Then the pattern or pattern plate and table 17 are lifted by the lifting plungers 1 and 2, thus drawing the pattern. The car is then run out carrying the finished mold.

The construction and mode of operation of the modification shown in Figs. 7 to 11 are as has been above described except that the flask receiving mechanism 28 and the jar ramming mechanism 29 are mounted upon a car 30, traversed back and forth to bring either the jar ramming mechanism or the flash receiving device into the molding machine. Pneumatic plunger mechanism generally indicated at 31 and 32 arranged at each end of the travel of the car 30 is shown for traversing it. In this modification the mold may be rammed when the parts are in the position shown in Fig. 9 and when the parts are in that position a previously rammed mold may be rolled over and deposited on the flask receiving means 28 and have its pattern drawn so that at the next movement of the car the finished mold will be presented on the receiving means 28 in the position shown in Fig. 8.

The construction and mode of operation of the modification shown in Figs. 12 to 14 are as has above been described except that an additional molding machine 33 is employed, and the additional molding machine 33 is just like the molding machine 34 already described except that it is devoid of rollover provisions so that the shafts 35, Fig. 14, are not rotatable but the detachable lift off pin connection 36 is present and operates upon the flask 37. The car 38 is provided with two jar ramming mechanisms 39 and 40, and with flask receiving mechanism 41 arranged between them. The machine of this modification is adapted to make copes and drags and to assemble them ready for pouring. It may be remarked that as shown the hydraulic traversing mechanism 42, generally, is shown as larger than the traversing mechanism 43, or otherwise adapted to overcome it so that by the application or release of internal pressure in the mechanism 42 the car is moved in one direction or the other.

In describing the mode of operation the machine 34 will be referred to as a drag machine and the machine 33 as a cope machine. With the parts in the position shown in Fig. 13 both jar ramming mechanisms 39 and 40 are operated to ram flasks. The car remaining at rest, the drag machine is operated to lift the mold and pattern. The drag machine is rolled over and the car moved to the left, thus putting the cope under the cope machine 33, and the receiving table or mechanism 44 under the drag. With the car at rest in that position the drag is lowered onto the flask receiving means 41 and the pattern is drawn by the machine 34. The cope is raised by the machine 33 and the cope pattern drawn. The car is then traversed toward the right bringing the drag from which the pattern has been drawn by the machine 34 under the cope in the place formerly occupied by the jar ramming machine 39, and the cope is lowered onto the drag so that the complete mold may be lifted from the receiving mechanism 41.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A molding machine including a pair of spaced lifting plungers arranged at each side of the machine, a lifting head for each pair of plungers, a double armed crank shaft mounted in each head and whereof one arm is a mold table carrier arm and whereof the other arm is a rollover arm, a rollover cylinder, a piston interposed between each lifting head and its rollover arm, parallel motion cable gear accommodated by the space provided between the lifting plungers of each pair of plungers and adapted to secure synchronous movement of said lifting heads, a mold table having detachable lift off pin connection with the table carrying arms, jar ramming and flask receiving mechanisms accommodated by the space provided between the pairs of plungers, and spring locking mechanism carried by the mold table for normally locking the mold table to the table carrying arms and adapted to be released by contact with the top face of the jar ramming mechanism.

2. A molding machine including a pair of spaced lifting plungers arranged at each side of the machine, a base for each pair of lifting plungers, a lifting head for each pair of plungers, an armed crank shaft mounted in each head and whereof the arm is a mold table carrier arm, means for turning the crank shaft, parallel motion cable gear accommodated by the space provided between the lifting plungers of each pair of plungers and by space provided in said bases, a mold table adapted for detachable connection with the table carrying arms, jar ramming and flask receiving mechanisms accommodated by the space provided between the pairs of plungers, and locking mechanism carried by the table and adapted to be released by contact with the top face of jar ramming mechanism.

3. A molding machine including a pair of spaced lifting plungers arranged at each side of the machine, a base for each pair of lifting plungers, a lifting head for each pair of plungers, an armed crank shaft mounted in each head and whereof the arm is a mold table carrier arm, means for turning the crank shaft, parallel motion cable gear accommodated by the space provided between the lifting plungers of each pair of plungers and by space provided in said bases, a mold table adapted for detachable connection with the table carrying arms, a car, cope and drag jar ramming mechanisms and a flask receiving mechanism interposed between them and all carried by said car, a second set of lifting plungers and their accessories as in this claim recited but devoid of rollover mechanism and thereby adapted to cope mold pattern drawing, and locking mechanism carried by the table and adapted to be released by contact with the top face of jar ramming mechanism.

4. A molding machine including pattern drawing mechanism, a car movable in respect to said mechanism, and shockless jar ramming means and flask receiving devices mounted on the car and adapted for co-operation with said pattern drawing mechanism.

5. A molding machine including a pair of lifting plungers arranged at each side of the machine, a lifting head for each pair of plungers, a double armed crank shaft mounted in each head and whereof one arm is a mold table carrier arm and whereof the other arm is a rollover arm, and a rollover cylinder and piston interposed between each lifting head and its rollover arm.

6. A molding machine including a pair of lifting plungers arranged at each side of the machine, a lifting head for each pair of plungers, a double armed crank shaft mounted in each head and whereof one arm is a mold table carrier arm and whereof the other arm is a rollover arm, a rollover cylinder and piston interposed between each lifting head and its rollover arm, and parallel motion cable gear accommodated by space provided between the lifting plungers of each pair of plungers and adapted to secure synchronous movement of said lifting heads.

7. A molding machine including a pair of spaced lifting plungers arranged at each side of the machine, a lifting head for each pair of plungers, a double armed crank shaft mounted in each head and whereof one arm is a mold table carrier arm and whereof the other arm is a rollover arm, a rollover cylinder, a piston interposed between each lifting head and its rollover arm, parallel motion cable gear accommodated by the space provided between the lifting plungers of each pair of plungers and adapted to secure synchronous movement of said lifting heads, a mold table having detachable lift off pin connection with the table carrying arms, and jar ramming and flask receiving mechanisms accommodated by the space provided between the pairs of plungers.

WILFRED LEWIS.